US006966537B2

(12) United States Patent
Sundararajan

(10) Patent No.: US 6,966,537 B2

(45) Date of Patent: Nov. 22, 2005

(54) VALVE WITH SEAT ASSEMBLY

(75) Inventor: Alagarsamy Sundararajan, Katy, TX (US)

(73) Assignee: Worldwide Oilfield Machine, Inc., Houston, TX (US)

( * ) Notice: Subject to any disclaimer, the term of this patent is extended or adjusted under 35 U.S.C. 154(b) by 146 days.

(21) Appl. No.: 10/423,257

(22) Filed: Apr. 25, 2003

(65) Prior Publication Data

US 2004/0178381 A1 Sep. 16, 2004

Related U.S. Application Data

(60) Provisional application No. 60/453,536, filed on Mar. 11, 2003.

(51) Int. Cl.[7] .............................................. F16K 25/02

(52) U.S. Cl. ....................... 251/172; 251/175; 277/641

(58) Field of Search ............................... 251/172, 175, 251/328; 277/641

(56) References Cited

U.S. PATENT DOCUMENTS 2,861,771 A * 11/1958 Bryant ........................ 251/172
3,090,630 A 5/1963 Gasche
3,307,826 A * 3/1967 Lowrey ....................... 251/172
3,416,558 A * 12/1968 Works ......................... 251/172
3,521,855 A * 7/1970 Jensen ........................ 251/172
3,972,507 A * 8/1976 Grove ......................... 251/172
4,068,821 A * 1/1978 Morrison ..................... 251/172
4,252,352 A 2/1981 Scannell
4,353,525 A 10/1982 DiDomizio, Jr.
4,372,530 A 2/1983 Livorsi
4,741,509 A 5/1988 Bunch et al.
4,878,651 A 11/1989 Meyer
5,139,274 A 8/1992 Oseman
5,201,872 A 4/1993 Dyer
5,205,536 A * 4/1993 Holec ......................... 251/172
5,431,415 A 7/1995 Millonig et al.
5,639,102 A 6/1997 Ilesic
6,123,340 A 9/2000 Sprafka et al.
6,260,822 B1 * 7/2001 Puranik ...................... 251/328
6,279,875 B1 * 8/2001 Chatufale ................... 251/172
6,345,805 B1 2/2002 Chatufale
6,494,465 B1 12/2002 Bucknell

* cited by examiner

*Primary Examiner*—John Bastianelli
(74) *Attorney, Agent, or Firm*—Kenneth L. Nash

(57) ABSTRACT

A valve is disclosed having a telescoping seat assembly that fits into a pocket or enlargement of a flow passageway through the valve body. An outer seat element seals with the pocket utilizing a plurality of seal assemblies to seal with the pocket whereby pressure may become trapped between the seal assemblies during valve operation under certain unusual conditions. A groove with a tapering or angled surface is provided in the outer seat. A seal ring is disposed in the groove whereby pressure from one side of the seal ring moves the seal along the tapering or angled surface to wedge the seal into contact with the wall of the pocket. Pressure from the other side of the seal ring moves the seal ring along the tapering surface and away from the wall of the pocket so as to be out of sealing engagement thereby permitting bleeding off of the pressure or de-energizing of the seal assemblies.

23 Claims, 11 Drawing Sheets

DOWNSTREAM
UPSTREAM
10
12
14
16
18
20
28
30
32
34
36
38
40
42
44
46
48
50
62
66
68
70
72
74
76
78
80
82
84
85
86
87
88
92
100
102

VALVE WITH SEAT ASSEMBLY

BACKGROUND OF THE INVENTION

Benefit is hereby claimed of U.S. Provisional Application No. 60/453,536 filed on Mar. 11, 2003.

1. Field of the Invention

The present invention relates generally to valves and, more particularly, to apparatus and methods for a valve telescoping seat assembly.

2. Description of the Background

Telescoping seat assemblies have been known for use in gate valves for some time. One advantage of this type of seat assembly is the ability to provide a force on the seats and valve body that varies due to pressures encountered. In this way, one is assured of a good seal with a wide range of pressures. Another advantage of one exemplary type of telescoping seat assembly is the ability to provide both an upstream and a downstream seal. This provides two working seals that thereby increase the reliability of operation as compared with most other valves that utilize only one seal, such as a downstream seal. Another advantage is that friction due to movement of the gate may be kept at a minimum because the sealing force exerted by the seat assemblies automatically adjusts as necessary to securely maintain a gas-tight seal but is decreased at lower pressures to reduce friction wear.

Especially for the case of the upstream seal, it may be desirable to de-energize the seals after operation by releasing any trapped pressure that may become trapped between any sealing assemblies during valve operation and/or in the cavity of the valve. While the seals are de-energized in normal operation, it would be desirable to provide a means for de-energizing seals under virtually any type of conditions and in which the seals may include any type of seal arrangement.

Unidirectional seals may be made of non-elastomeric and non-permeable materials that will operate under much wider ranges of temperatures, fluids, and pressures. However, such seals do not create a reliable seal as easily as elastomeric O-rings. The tolerances must be much tighter and the surfaces cannot tolerate imperfections. The seals may be more sensitive to debris than O-ring seals.

The original telescoping gate valve seat assembly to simultaneously provide both upstream and downstream sealing is shown in U.S. Pat. No. 4,878,651, issued Nov. 7, 1989, to F. W. Meyer, Jr., developed at Worldwide Oilfield Machine, Inc., which is incorporated herein by reference and discloses a through conduit gate valve apparatus with a valve seat assembly that is field-maintainable and which prevents the occurrence of pressure lock. Each valve seat assembly includes a retainer ring fixed in the valve body and a pressure responsive seat ring that seals with the gate member. The seat ring is responsive to fluid pressure in the valve flow passageways for maintaining and enhancing the face seal with the gate and simultaneously to fluid pressure in the valve chamber for automatically venting the valve chamber to prevent occurrence of a pressure lock condition.

Another telescoping valve seat assembly gate valve is shown in U.S. Pat. No. 5,201,872, issued Apr. 13, 1993, to M. L. Dyer, assigned to Worldwide Oilfield Machine, Inc., which is also incorporated herein by reference, that discloses a gate valve wherein bore pressure in the body cavity of the valve is isolated in the open and closed position. In the closed position, a double metal sealing barrier is provided across the gate. In the open position, the pressure is isolated from the stem packing and bonnet gasket by the seats on either side of the gate. Formation of hydrates in the body cavity is eliminated, and better retention of body grease is achieved during flow through the valves. Metal-to-metal seal surfaces are developed, thereby eliminating wear on the nonmetal components and reducing torque requirements.

U.S. Pat. No. 4,741,509, issued May 3, 1988, to Bunch et al., developed at Worldwide Oilfield Machine, Inc., discloses a gate valve with a body having a valve member and gate chamber, passages communicating through the body into the chamber, a recess in the body surrounding the opening of each passage into the chamber, a bushing positioned in each recess, a gate positioned within the chamber, means for moving the gate within the chamber between positions communicating flow between the passages and closing flow between the passages, inner and outer unidirectional seals positioned between the surface of each recess facing the gate and the opposing surface of the bushing in the recess; each seal includes a U-shaped lip sealing element and a U-shaped spring positioned within the lip sealing element and urging the legs of the element apart into sealing engagement between the bushing and the body; the inner seal, which is positioned closest to the passage, has the open end of its sealing element facing the passage; and the outer seal, which is farther from the passage than the inner seal, has the open end of its sealing facing away from the passage; each seal and the body that has a depth less than the height of the seal while it is still in an effective sealing condition, the seals being compressible in height so that their bushings engage the body recess in a metal-to-metal seal when they are loaded and recoverable from such compressed position to provide a tight seal when the loading is relieved.

U.S. Pat. No. 6,260,822, issued Jul. 17, 2001, to D. Sudhir Puranik, developed at Worldwide Oilfield Machine, Inc., discloses a seat assembly including preferably telescoping seating elements for use between a gate and a pocket in a gate valve body. A seal is provided between the telescoping seating elements that is axially moveable and acts to seal with one or more sloping surfaces disposed on the seating elements. A spring acts to bias the seal toward the sloping surfaces so as to provide an initial seal. The sloping surfaces prevent movement of the seal in one axial direction. As line pressure increases, the seal will move against the sloping surfaces with increased force to maintain the seal between the line or valve bore and the bonnet of the valve. A reverse pressure differential across the seal that is greater than the biasing force will cause the seal element to move in the opposite axial direction and bleed off the pressure across it. The seal may be metallic or have a metal core with a coating of substantially non-elastic, non-permeable, chemically inert material of the type that is resistant to well bore fluids and other chemicals unaffected by substantial changes in temperature.

U.S. Pat. No. 6,279,875, issued Aug. 28, 2001, to Vijay R. Chatufale, developed at Worldwide Oilfield Machine, Inc., discloses a gate valve having a telescopingly interfitted seat assembly that fits into a recess in a gate chamber between the gate valve body and the gate. A sealing cavity is formed between two seat elements that form the telescopic connection. A preferably unidirectional seal is disposed therein having two lip seals. The unidirectional seal is preferably oriented to allow leakage for a pressure differential wherein the gate chamber has a higher pressure than the pressure on the opposite side of the seal from the gate chamber. The seal is preferably made of non-permeable material and the material is preferably flexible but non-elastic with little or no memory. Additional such seals may be used for sealing with the gate valve body. In one embodiment, an expansion member is provided for extending into an open end of the seal to expand the two lip seals. An additional bi-directional seal may be provided that is sized to allow leakage when the two seat elements are expanded and to seal when a preferably floating gate compresses one of the telescoping sets seat elements.

U.S. Pat. No. 6,345,805, issued Feb. 12, 2002, to Vijay R. Chatufale and developed at Worldwide Oilfield Machine, Inc., discloses a rotary plug valve that has two telescoping seat assemblies that fit into respective recesses provided in the valve body surrounding a passageway through the plug valve. A valve chamber is formed in the valve body into which the rotary plug may be positioned to control flow through the valve by rotation thereof. In a preferred embodiment, the telescoping seat assemblies provide an upstream and a downstream seal with the rotary plug. The telescoping seat assemblies preferably function differently when in the open and closed position so that both assemblies expand when in the open position whereas in the closed position one assembly expands and one is compressed. A line pressure surface is provided to provide a force against the plug seal seat element. The plug seal seat element and plug mate with a curved surface and the contact stress varies depending on the location along the curved surface. The line pressure surface is made large enough so that a sufficient portion of the mating surface has a contact stress greater than line pressure so as to form a fluid tight, e.g., gas tight, seal. In one preferred embodiment, the line pressure surface is made large enough so that the average contact stress is greater than line pressure. In another embodiment, the seals are comprised of a non-permeable material that is sufficiently flexible to conform to sealing surfaces.

Various types of seals have been utilized in valves and hydraulic systems.

U.S. Pat. No. 6,494,465, issued Dec. 17, 2002, to John Wentworth Bucknell, discloses a seal for hydraulic assemblies operating at high temperatures having adaptations for low pressures sealing and configured to move across the gap to be sealed at higher pressures with an angled base on a slope or a cup shape nested into a groove. The seal at the point of the gap being an elastic, metallic material.

U.S. Pat. No. 6,123,340, issued Sep. 26, 2000, to Sprafka et al., discloses a seal for use in a modular flow device and is utilized for joining and aligning a first mating surface and second mating surface having axial flow passageways. The seal comprises a protruding annular radiused edge about the axial passageway of the first mating surface and an annular groove about the axial passageway of the second mating surface. The groove has an inner angled wall for engaging with the annular radiused edge when the mating surfaces are compressively joined. Thus, a leak proof seal is formed around the fluid passageway and the passageways are aligned with respect to each other. The invention also relates to check valves for use with modular surface mount systems in which the check valve can be used as a surface-mounted component or as part of a substrate that is mounted to or between other substrates and components.

U.S. Pat. No. 5,639,102, issued Jun. 17, 1997, to Peter Ilesic, discloses a sealing arrangement for sealing a conduit for a gaseous or liquid agent that includes a closable housing which fits sleeve-like around the conduit. A sealing member comprising elastomer material is arranged in the housing in an annular configuration therein and has an annular bead which projects toward the wall of the conduit. The bead has a sealing surface to be applied against the wall. The sealing member has an annular gap which subdivides the annular bead in the axial direction of the arrangement into a first radial bead portion at the inward side of the seal and a second radial bead portion at the outward side of the seal. The gap extends from the sealing surface into the annular bead at such an inclination that an acute-angled sealing lip is formed on the second bead portion adjoining the gap. At the inward side of the seal, the first bead portion can have an axially facing annular groove of an undercut configuration which on the first bead portion forms an acute-angled sealing lip which is directed inwardly of the seal.

U.S. Pat. No. 5,431,415, issued Jul. 11, 1995, to Millonig et al., discloses a seal element for installation in an annular groove having a mouth, first and second radial surfaces, and an axial surface therebetween. The seal element has a first radial surface which forms an acute heel angle with the groove first radial surface, and the seal element forms an inner static area adjacent the groove axial surface and first radial surface. Upon installation of a rod and low pressure application, the seal element is compressed into the groove, and the seal element first radial surface is moved into contact with the groove first radial surface. Thus, the seal element prevents contamination from entering into the inner static area. The seal element has first and second angled surfaces forming a high pressure sealing line and third and fourth angled surfaces forming a low pressure sealing line with a stress-relieving radius interconnecting the second and third angled surfaces. When the seal element is positioned in the groove, the angled surfaces face in the direction of and partially protrude through the groove mouth. The stress-relieving radius relieves excessive tensile stress, thereby alleviating the problem of cracking at the sealing face and premature seal failure. Moreover, the stress-relieving radius provides better flexing motion to the low pressure sealing lip, thereby avoiding high compressive stress and reducing the compressive set on the low pressure sealing lip.

U.S. Pat. No. 5,139,274, issued Aug. 18, 1992, to Gaven S. Oseman, discloses a hydraulic seal for sealing between two hydraulic components that move axially one within the other that comprises a first pressure-energized ring seal located between the components so as to respond to hydraulic pressure on an axially directed inner face of the seal, and a second ring seal located adjacent the inner face of the first seal so as to control the flow of hydraulic fluid to the first seal. The second ring seal is located in an annular groove in one of the components with an outer annular face that is directed axially toward the first seal and lies opposite an adjacent side wall of the groove to be supported thereby. A sealing lip protrudes from the groove and has a radially directed annular sealing face to engage in face-to-face contact with the other of the components. An annular inner face of the second ring seal is angled within the groove away from an adjacent side wall of the groove and toward the sealing lip so that the sealing lip can flex within the groove away from the first seal to release excess pressure between the first and second seals.

U.S. Pat. No. 4,372,530, issued Feb. 8, 1983, to Carl F. Livorsi, discloses a butterfly valve which is disposed in a valve body for sealing engagement with a resilient seat ring disposed in a tapered groove defined by the valve body and a retaining ring. A metallic back-up ring is disposed between two legs of the seat ring to support a sealing portion thereof when the valve is closed. Flanges on the legs retain the seat ring together with the backup ring in the groove. Parallel walls at the bottom of the groove insure seat ring and back-up ring retention. An "O" ring is disposed between the back-up ring, the flanges and the groove bottom and pressurized fluid passageways are provided to produce a two-way pressure assist for sealing.

U.S. Pat. No. 4,353,525, issued Oct. 12, 1982, to Robert A. DiDomizio, Jr., discloses a rotary valve which has a fluid seal ring which is loosely captured within a valve body and provides a fluid seal at a peripheral edge of a movable member selectively positionable in a fluid conduit. The seal ring has an annular coaxial recess located on an inner side face thereof. A fixed valve seat member retained in the valve body coaxially with the seal ring has an outwardly projecting cantilever beam in the form of an integral annular ring located on a side face thereof. The end of the cantilever beam is provided with a tapered face arranged to cooperate with a tapered wall surface defining a side of the recess within the seal ring. The contact between the tapered side face of the cantilever beam and the tapered recess surface provides a fluid seal which is selectively positionable along the tapered recess surface to permit a self-aligning action of the seal ring to accommodate varying mechanical eccentricities of the seal ring in its fluid sealing position.

U.S. Pat. No. 4,252,352, issued Feb. 24, 1981, to John B. Scannell, discloses a sealing ring for a rotary shaft. The sealing ring has a planar frusto-conical configuration and is received in an obliquely slanted groove provided in either the rotary shaft or the bearing surface surrounding the shaft. The use of an obliquely slanted groove causes seal contact over a wide area on the rotary shaft reducing heat buildup, while the frusto-conical configuration insures that the lips of the seal are in firm continuous circumferential contact with the shaft. Oblique mounting of the sealing ring also causes axial flow of the fluid being sealed and the formation of a fluid annulus adjacent the seal and on the pressure side thereof. Selective positioning of a plurality of obliquely mounted sealing rings results in the formation of complementary annuli and the axial flow of fluid between adjacent sealing rings.

U.S. Pat. No. 3,090,630, issued May 21, 1963, to Fred Gasche, discloses a high pressure joint which can be taken apart and put back together again many times without changing the gaskets. The joint has a resilient metal gasket, usually of the same metal as the body and cover, with narrow annular sealing lands on the upper and lower surfaces occupying only a fraction of the radial width of the gasket. The lands converge toward each other in a radially outward direction at an acute angle and seal against mating converging surfaces of the cover and body. If the cover and body should separate, sealing contact is maintained by radial expansion of the gasket.

Thus, in some cases, the present invention provides for the possibility of de-energizing seals during operation of the valve bonnet in a manner not shown by the prior art. In another application, it would be desirable if the downstream seat assembly were constructed to provide a backup seal if the upstream seat assembly were to fail. Those skilled in the art have long sought and will appreciate the present invention which addresses these and other problems.

SUMMARY OF THE INVENTION

It is an object of the present invention to provide an improved seat assembly for a gate valve.

It is another object of the present invention to provide an improved seal assembly de-energizing means.

It is another object of the present invention to provide a seat assembly that includes a unidirectional seal assembly.

It is yet another object of the present invention to provide a seat assembly that operates at higher temperatures and pressures.

It is yet another object of the present invention to provide a seating assembly that will provide a backup downstream seal in case the primary upstream seal fails.

These and other objects, features, and advantages of the present invention will become apparent from the drawings, the descriptions given herein, and the appended claims. However, it will be understood that the above-listed objectives of the invention are intended only as an aid in understanding aspects of the invention, and are not intended to limit the invention in any way, and therefore do not form a comprehensive or restrictive list of objectives, and/or features, and/or advantages of the invention.

Accordingly, the present invention may comprise one or more elements for a valve such as, for instance, a valve body having a closure member and a closure member chamber therein, inlet and outlet passages extending through the valve body and in communication with the chamber to define a flow path through the valve body, the valve body having a pocket surrounding the inlet and outlet passages adjacent to the closure member chamber, and/or a telescoping seat assembly in each of the recesses. Each of the telescoping seat assemblies comprise an outer seat element for sealing within the pocket of the valve body. The inner seat element is moveable with respect to the outer seat element for sealing engagement with the closure member.

In one embodiment, a de-energizing seal assembly is provided adjacent to the pocket of the valve body. The de-energizing seal may also be disposed between the inner seat element and outer seat element. The de-energizing seal assembly may comprise a groove with a tapered surface such that the seal is moveable along the tapered surface. When pressure acts on one side of the seal, a force is produced on the seal which wedges the seal into engagement with the pocket of the valve body to thereby effect a seal. Pressure acting on an opposite side of the seal moves the seal away from engagement with the pocket of the valve body to permit leakage past the seal.

Other elements may comprise one or more slots in the outer seat element. The one or more slots open into the groove. In one preferred embodiment, the tapered surface defines a groove depth which increases with increasing radial distance from the flow path. In another embodiment, the valve may further comprise a second groove defined between the first seat element and the second seat element, the second groove having therein a tapered surface which varies in depth with increasing distance of the tapered surface from the flow path.

In one embodiment, the outer seat element and the inner seat element may define a slot therebetween and a pair of oppositely oriented unidirectional seals may be mounted within the slot. The valve may further comprise a seal ring mounted between the pair of oppositely oriented unidirectional seals.

While the present invention will be described in connection with the presently preferred embodiments, it will be understood that it is not intended that the invention is limited to those particular embodiments, but the descriptions given herein are merely to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims are encompassed as a part of the present invention.

DETAILED DESCRIPTION OF THE PREFERRED EMBODIMENTS

In one embodiment of the present invention, an objective is successfully reached for providing a gate valve operable to control a wider range of fluids at wider ranges of temperature and pressure and to de-energize the seals under a wide variety of conditions when the valve is cycled during operation. The gate valve of the present invention also discloses one or more apparatus and methods by which a secondary seal can be provided if a primary seal fails. As well, the gate valve of the present invention may be designed so that pressure lock may be eliminated in one or more ways.

Figure 1:
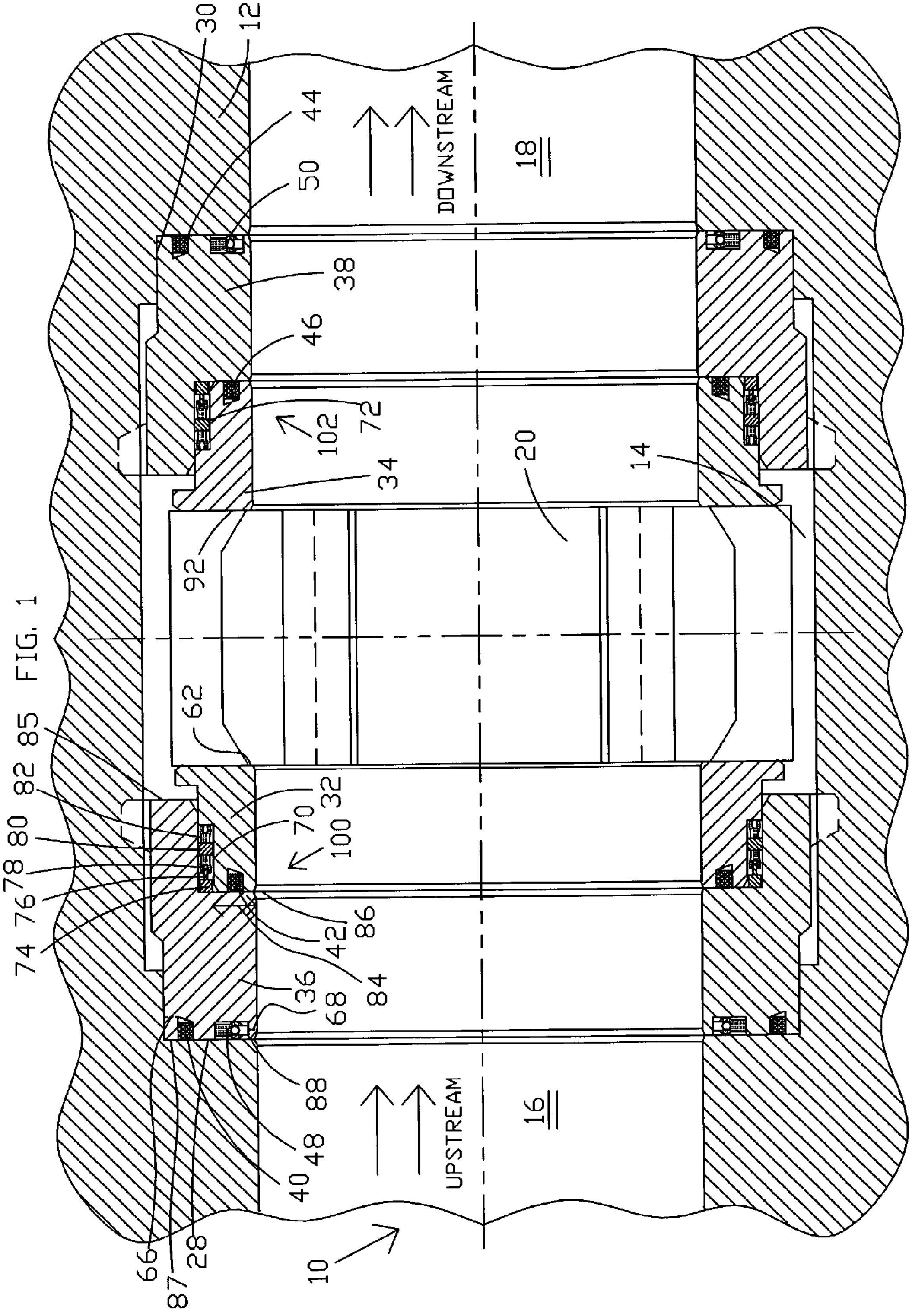
FIG. 1 is an elevational view, partially in section, of a gate valve in accord with the present invention.

Referring now to the drawing, and more particularly to FIG. 1, where one possible preferred embodiment of gate valve 10, in accord with the present invention, is illustrated. Gate valve 10 uses two preferably mirror image sets of telescoping seat elements, such as upstream seat elements 100 and downstream seat elements 102, that have many advantages for operation with a gate valve as discussed hereinafter. While the seat elements may preferably be mirror image sets, the operation of the seat elements 100 in the upstream environment preferably varies from operation of seat elements 102 in the downstream environment.

Gate valve 10 includes a valve body 12 which may be of many types as is known to those of skill in the art some variations of which are shown in the patents referenced hereinbefore. Valve body 12 defines body cavity or chamber 14 which is formed within valve body 12 and contains the working gate valve components. Valve body 12 defines flow passageways 16 and 18 which are preferably aligned on a common axis and preferably form a straight through flow path in which fluid flow is controlled. Depending on design, passageways 16 and 18 are typically designated as upstream and downstream passageways and, in some types of valves, may require connection in this manner. However, the design shown in FIG. 1 permits either of passageways 16 or 18 to be upstream or downstream due to mirror seat elements 100 and 102. Together flow passageways 16 and 18 form a continuous passageway for fluid to flow through gate valve 10 when valve 10 is open. Flanges (not shown), knock-up connection, and/or any type of connection may be utilized to connect gate valve 10 in position with the line to be controlled. Gate valve 10 may be used to control a line with fluids under pressure such as gas, oil, chemicals, mixtures, flurries, and the like, as desired.

When the present invention is utilized as a gate valve, then positioned within chamber 14 is gate 20 that moves transversely and preferably at a right angle with respect to the axis of flow passageways 16 and 18 to thereby open and close gate valve 10. Gate 20 may be operated by an operating stem or other means (not shown) as is well known to those of skill in the art. However, the seal arrangement disclosed herein, or any variation thereof, may also be utilized in a rotary valve such as plug valves, ball valves, and the like.

Preferably gate 20 is mounted to be a floating gate thereby allowing some, typically very slight, axial movement of gate 20 in line with the flow passageways 16 and 18. However, the design of the present invention may also be utilized with a non-floating gate. The axial movement of the gate valve may be used to assist downstream sealing as discussed with respect to subsequently disclosed embodiments of the present invention. Gate 20 is shown in the closed position in FIG. 1. It is extremely well known that to open gate valve 10, gate 20 moves upwardly and laterally with respect to flow passageways 16 and 18 until the gate passageway is lined up with flow passageways 16 and 18. Thus in one presently preferred embodiment, when gate is in a downward position as shown in FIG. 1, the valve is closed. When gate 20 is in an upward position, the valve is open.

It will be understood that the terms "upper," "lower," and the like, refer to the figures and are used for convenience only and that the same components or portions of them may be oriented in different ways in operation, storage, manufacturing, and so forth as known by those skilled in the art. The outer surfaces on gate 20 are preferably polished for sealing purposes as is known to those of skill in the art. Gate 20 is typically operated by some means such as a hydraulic actuator or manual operator (not shown). Other means or general control arrangements for operating gate 20 or other valve control elements such as plugs, balls, etc., are known to those of skill in the art.

Valve body 12 has formed therein enlarged pockets or recesses 28 and 30 that mate with seat elements 100 and 102. Valve seat elements 100 and 102 operate within pockets or recesses 28 and 30 in coordination with gate 20 to preferably form upstream and downstream seals thereby reliably preventing flow through gate valve 12 when gate 20 is closed. In one preferred embodiment, a metal-to-metal seal between gate 20 and the inner valve seat elements 32 and 34 of seat assemblies 100 and 102, respectively, is formed as is known to those of skill in the art. The seal between outer valve seat elements 36 and 38 of seat assemblies 100 and 102, respectively, and pockets 28, 30 may be of many types and may include multiple seals including metal-to-metal, elastomeric, non-elastomeric, unidirectional, and any other type of seal. A few types of such seals are disclosed herein but those of skill in the art will understand that the number of possible seal assemblies are practically unlimited.

Figure 1A:
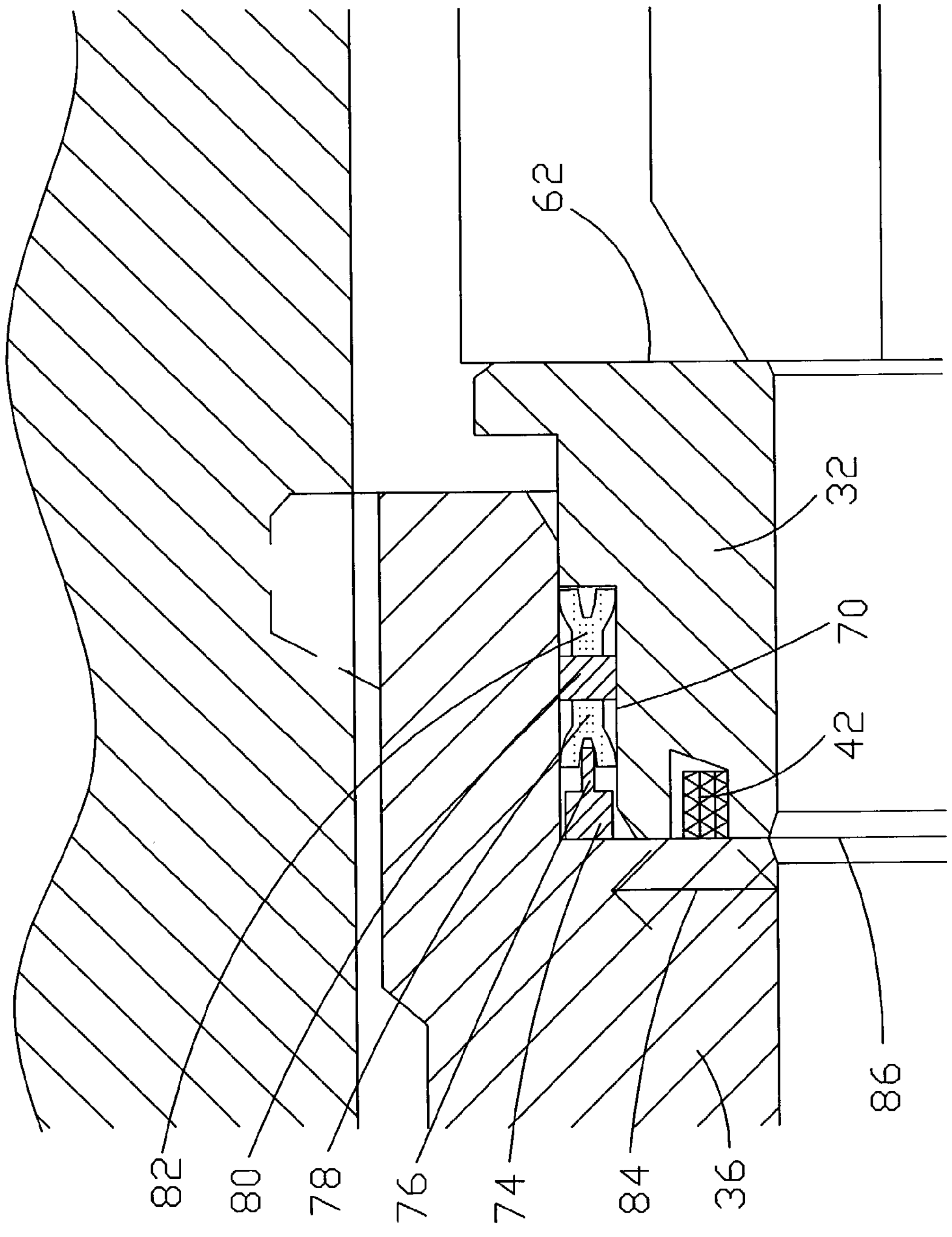
FIG. 1A is an enlarged elevational view, partially in section, showing seals for the seat assemblies in accord with the present invention.
Figure 1B:
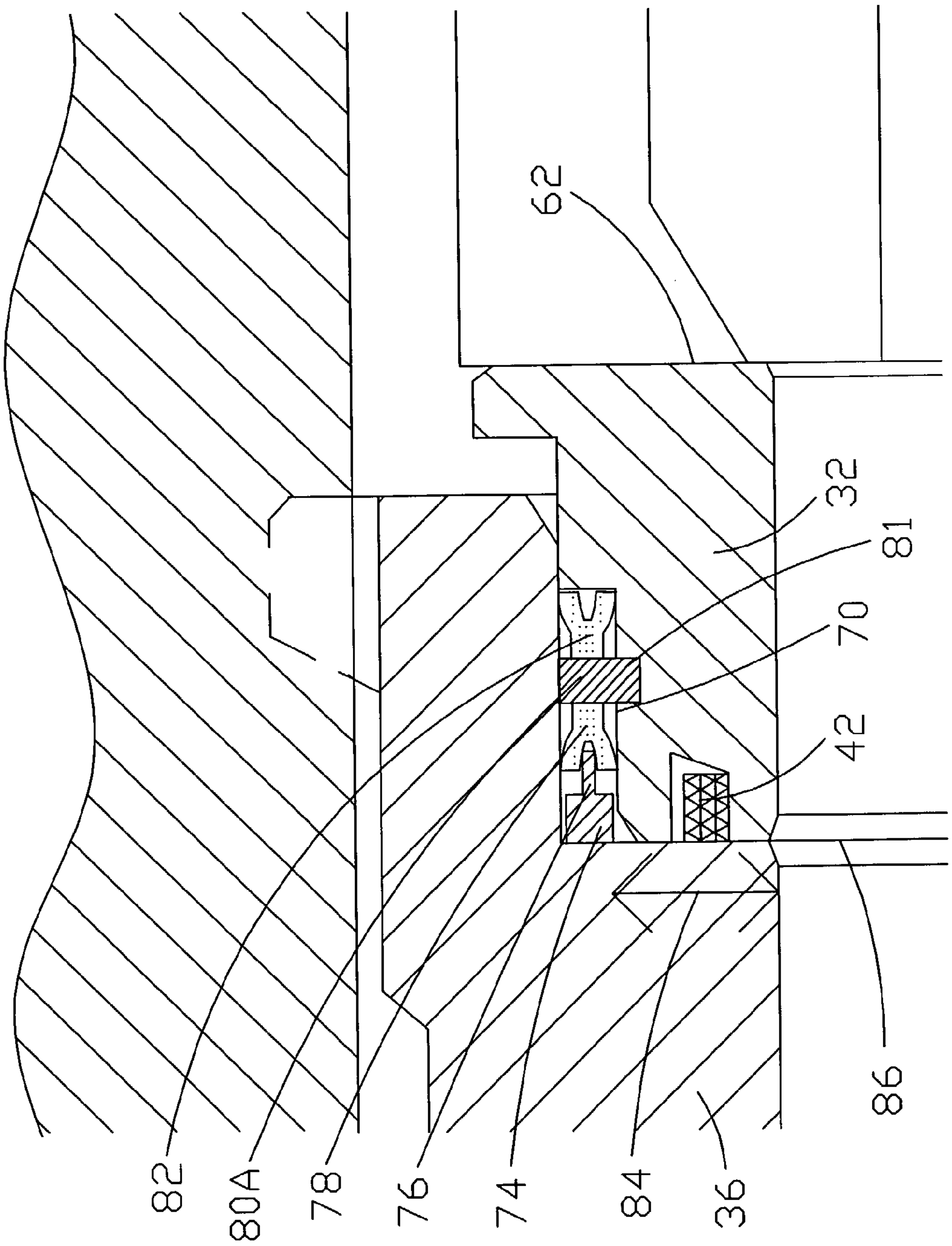
FIG. 1B is an enlarged elevational view, partially in section, showing seals for the seat assembly utilizing a split ring in accord with the present invention.

As noted above, inner seat elements 32, 34 are positioned closest to gate 20 and are utilized to seal with gate 20. Outer seat elements 36, 38 are positioned distal to gate 20 as compared to inner seat elements 32, 34. Inner seat elements 32, 34 are preferably telescopingly mounted with respect to outer seat elements 36, 38 so that there is relative axial movement therebetween. Many types of seal arrangements may be utilized with the outer seat elements 36, 38 and inner seat elements 32, 34. In FIG. 1, unidirectional U-shaped high temperature seals are shown being utilized in combination with other seals. For reference, FIG. 1B shows an enlargement of unidirectional U-shaped seal elements 78 and 82.

In one presently preferred embodiment, seal assemblies 40, 42 are provided on the upstream side and seal assemblies 44, 46 are provided on the downstream side to provide for de-energizing seals and for backup sealing. Seal assemblies 40, 48 and 44,50 operate to provide a seal between outer seat elements 36, 38 and the respective pockets 28 and 30. In the prior art, under certain conditions, pressure may become trapped between the seal assemblies and the pockets. For instance, certain type of seals may trap pressure between where seals 40 and 48 are positioned. When pressure is trapped, due to debris or viscous fluids, the pressure could move element 36 away from pocket 28 which may cause valve operational problems. It is desirable to eliminate this possibility by "de-energizing" these seals.

In this embodiment, seal assemblies 48 and 50 are U-shaped unidirectional seals which are oriented to prevent fluid flow from within valve passageways 16 and 18 into the valve chamber 14. On the other hand, these seals should permit flow in the opposite direction. As an example of operation, the wings or legs of seal 48 should permit de-energizing or release of pressure trapped between seal assembly 40 and 48. However, it may be desirable to provide additional de-energizing means as well as additional downstream sealing capability. Unidirectional seal assembly 40 is representative of seal assemblies 42, 44, and 46 so the discussion of seal assembly 40 applies to seal assemblies 42, 44, and 46 and will not be repeated for each of these assemblies.

Figure 2A:
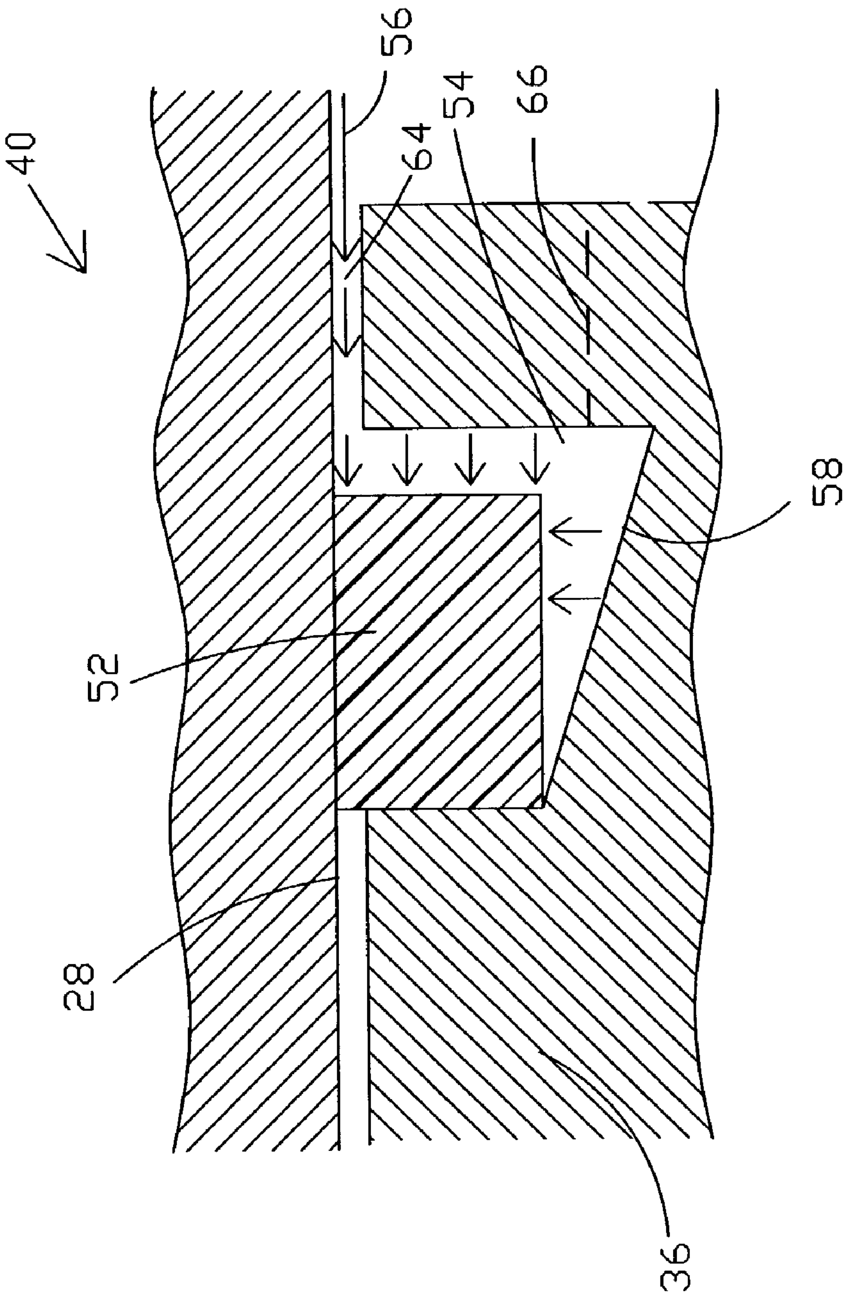
FIG. 2A is an enlarged elevational view, in section, of a portion of a unidirectional seal assembly with a seal element mounted in a first position for sealing in accord with the present invention.
Figure 2B:
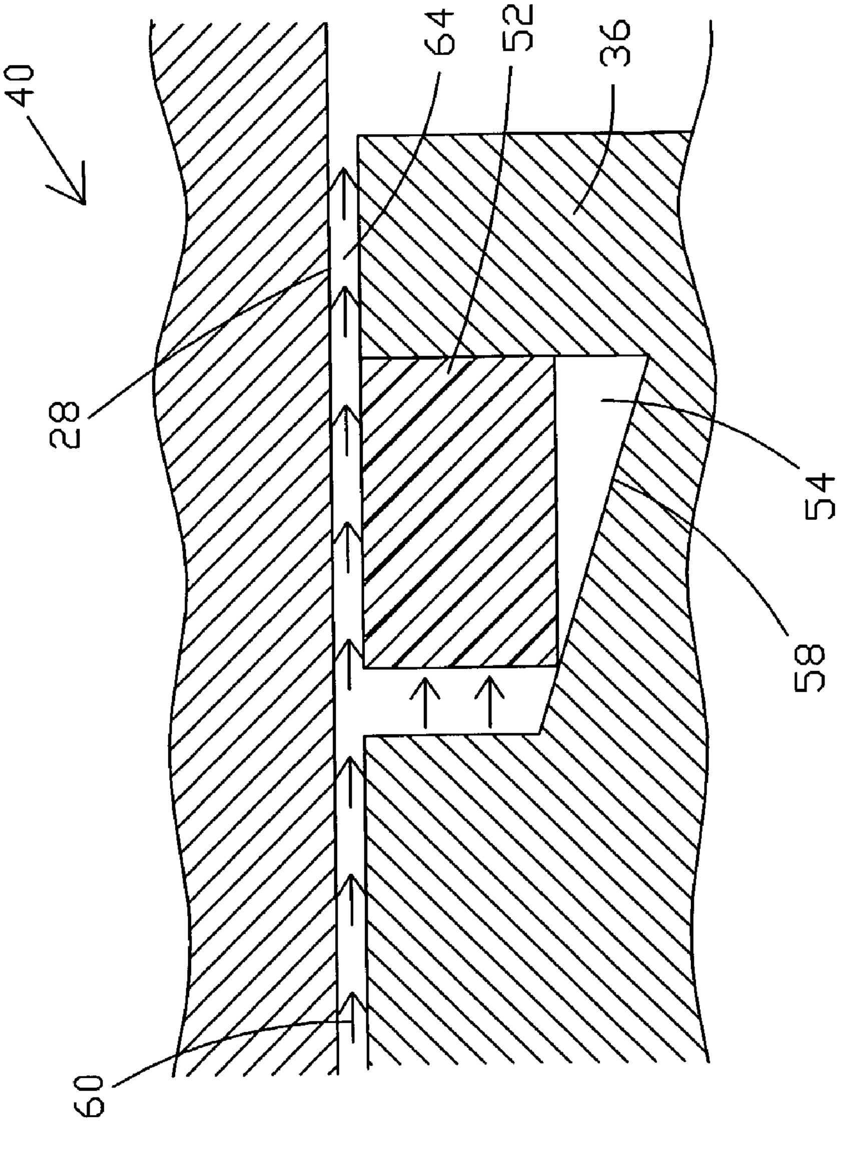
FIG. 2B is an enlarged elevational view, in section, of the seal assembly of FIG. 2A with the seal in a second position to permit de-energizing of the pocket seal assembly.

An enlarged view of seal assembly 40, and the operation thereof is shown in FIG. 2A and FIG. 2B. After review of the operation of seal assembly 40 as discussed below, then it will be appreciated how seal assembly 40 may be utilized to provide de-energizing of any pressure that might become trapped between seal assemblies 40 and 48 during operation of valve 10. For the discussion below, it will be understood that the dimensions of FIG. 2A and FIG. 2B are exaggerated to show the concepts and operation of seal assembly. Moreover, it will be understood that tolerances are in the range of thousandths of inches and may be varied somewhat as desired to permit the desired range operation in accord with the teachings provided herein.

Referring to FIG. 2A, sealing element 52 could be any desired type of sealing material such as polymers, thermoplastics, PEEK (polyetheretherketone), PES (polyethersulfone), PTFE (polytetrafluoroethylene), and the like. As well, nylon type materials, rubber, elastomeric, metal, composites, or any type of desired seal may be utilized herein. In one preferred embodiment, the material may be selected to be impervious to chemicals and high temperature, however any suitable material could conceivably be utilized for seal ring 52. While seal ring 52 is shown as being rectangular in cross-section, the seal cross-section may be of may different types such as round, oblong, or the like, and may be selected for use in the particular groove cross-section for operation as discussed hereinafter whereby seal ring 52 may be moveable within the groove as discussed hereinbelow. The particular cross-sectional shape of groove 54 may also vary significantly.

Groove 54 preferably is larger than seal ring 52 to permit movement of seal ring 52. The shape of groove 54 is selected to permit the seal assembly 40, which comprises seal ring 52 and groove 54, to release pressure that may become trapped between seal assemblies 40 and 48 during operation of valve 10, i.e., to de-energize the sealing assemblies. For this purpose, seal ring 52 is moveable, such as by a few thousands of an inch, between the positions shown in FIG. 2A and FIG. 2B.

FIG. 2A illustrates the sealing mode of operation. In FIG. 2A, fluid flow in the direction of arrow 56 creates pressure within the cavity of groove 54 which acts to push seal ring 52 downwardly as shown in FIG. 1, or to the left as shown in FIG. 2A. The angled, tapered, or sloped groove wall 58 then urges or wedges seal ring 52 toward the wall of pocket 28 to cause seal assembly 40 to form a tight seal therebetween. In light of the above discussion, it will be understood that many different types of sloping, curved, or angular walls such as angled wall 58 may be utilized that will provide a wedging action. Moreover, seal element 52 may have many different types of cross-sectional shapes that operate in conjunction with the sloping, curved, or angled wall 58. In this mode of operation, seal assemblies 40 and 44 are desirable for effecting downstream sealing. For instance in the situation of FIG. 1, if an upstream seal were to fail, then pressure in cavity 14 would force seal assembly 44 into the sealing mode as described above to provide a good downstream seal in downstream pocket 30.

On the other hand, referring to FIG. 2B which shows the de-pressuring mode of operation, when flow is in the direction of arrow 60 (upwardly in the orientation of FIG. 1 or to the right in the orientation of FIG. 2B), then seal ring 52 is pushed along tapered wall 54 and away from contact with the wall of pocket 28 thereby permitting fluid flow past seal ring 52 to permit de-energizing of seal assemblies 40 and 48. As mentioned earlier, unidirectional seal assembly 48 (and/or the mirror seal 50) will also act to bleed off trapped pressures higher than line pressure so that the use of seal assembly 40 provides redundancy of means for de-energizing the seal assemblies. In other words, a higher pressure trapped between seal assemblies 40 and 48 would be able to leak past the typically spring loaded wings of unidirectional seal 48 or the sliding seal assembly 40. Thus, the present invention provides redundancy in the de-energizing function to prevent pressure trapped between the seals in the valve pockets.

Once the trapped pressure is released from pocket 28, for example, outer seat element 36 is free to move toward pocket 28 to permit initial sealing the next time the gate is activated and/or to permit inner seal element 32 to move away from sealing surface 62 of gate 20 to permit pressure to bleed off out of cavity 14. Thus, high pressure within cavity 14 will bleed out into line passageways 16 and 18 if the line pressure is removed therefrom. Essentially, de-energizing permits the relative movement between the inner and outer seat members. Thus, even though cavity 14 may be repeatedly exposed to line pressure during opening and closing of the valve, the pressure in cavity 14 can bleed off if and when the upstream line pressure drops.

If desired, slots/holes/passageways or the like leading to groove 54 may be provided as flow paths to lessen any possibility of a blockage of flow paths such blockage of flow path 64 between outer seat element 36 and valve pocket 28, as best seen in FIG. 2A. Thus, one or more slots, such as slot 66, may be machined into outer seat element 36 that lead to groove 58. Likewise, similar energizing slots such as one or more slots 68 (see FIG. 1) in outer seat element 36 may be utilized to permit fluid flow directly to expandable seal assembly 48 for activating seal assembly 48 and/or to release pressure from between seals 40 and 48 for de-energizing purposes as discussed hereinbefore.

In one preferred embodiment of the present invention, seal assemblies 70 and 72 may be utilized to provide a seal between outer seat elements 36 and inner seat elements 32 and outer seat elements 38 and inner seat elements 34, respectively. An enlarged view of seal assembly 70 is shown in FIG. 1A. Seal assembly 72 is a mirror image of seal assembly 70.

In this embodiment, seal assembly 70 comprises seal ring 74 with energizing shaft or ring 76 which engages spreadable or unidirectional seal 78 to provide for initial low pressure sealing engagement. An additional seal ring 80 may be disposed between unidirectional seal 78 and unidirectional seal 82. Pressure entering seal assembly 70 from either direction increases the pressure of the expandable wings or legs of unidirectional seal 78 or unidirectional seal 82 to thereby maintain a tight seal. With upstream operation, seal 78 seals between inner and outer seat elements 32 and 36. For upstream operation seal element 42 permits fluid flow to provide pressure along the face of the seat elements 32 and 36 with radius 84 for reasons discussed hereinafter. With downstream operation, seal 82 provides a downstream seal between seat elements 32 and 36. For downstream operation, seal 42, the operation of which has already been discussed, seals to provide a backup seal should unidirectional seal 82 and seal ring 80 fail.

Figure 1C:
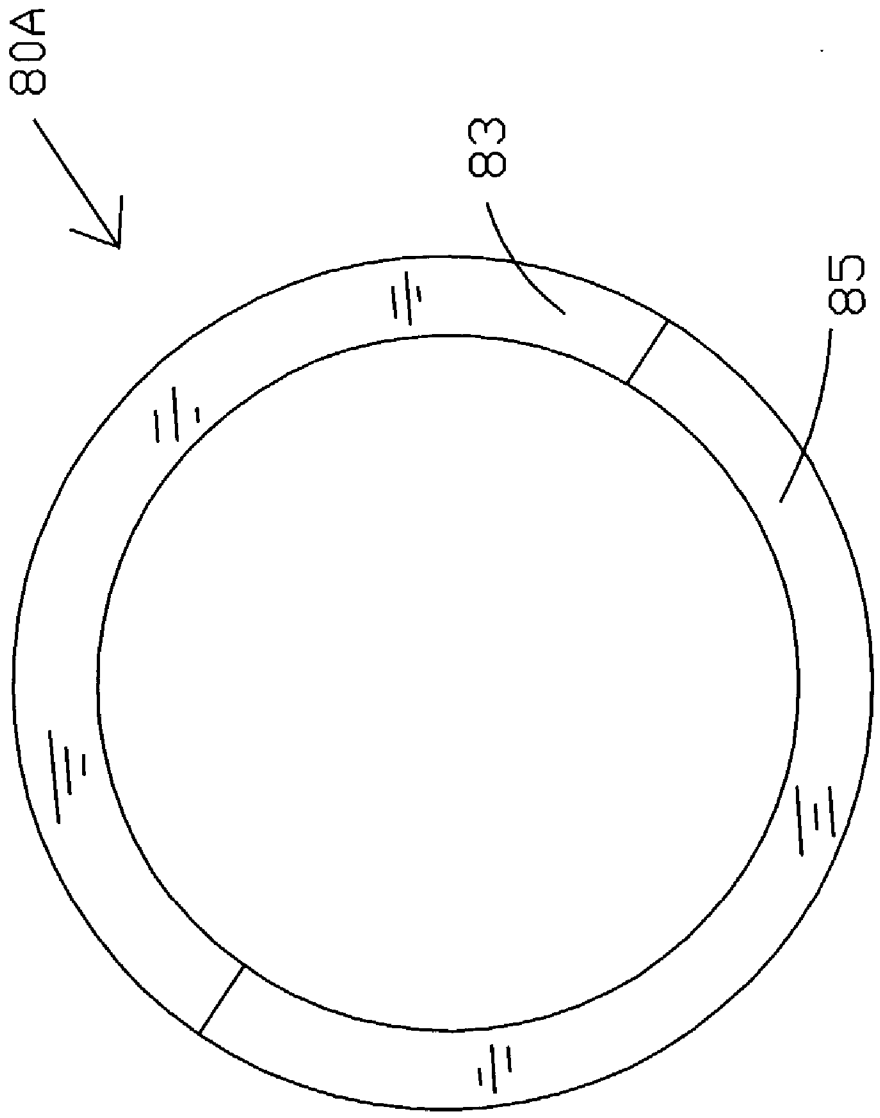
FIG. 1C is an enlarged elevational view, partially in section, of a preferred split ring for the embodiment of FIG. 1B.

Seal assembly 70, or numerous different constructions, some of which are disclosed in the prior art cited hereinbefore, may be utilized to provide a seal between inner and outer seat elements 32 and 36. However, the back-to-back arrangement of unijunction seal members 78 and 82 is especially useful for reasons discussed in the operation of the valve hereinafter. Seal members 78 and 82 may be secured to seal ring 80 or separate therefrom so as to be moveable with respect to seal ring 80. Seal ring 80 may or may not be utilized at all. Seal ring 80 may be of different constructions, materials, and the like. FIG. 1B shows another embodiment utilizing a seal ring 80A that is mountable in groove 81. Seal ring 80A could be an elastomeric seal ring that may be inserted into groove 80A or a split ring such as the split ring shown in FIG. 1C. If in the form of a split ring, as shown in FIG. 1C, then seal ring 80A may be comprised of one or more sections 83 and 85 that may be interconnected together with tongue and groove end connections or other means. With a split ring construction, seal ring 80A may be formed of non-elastic sealing materials such as materials discussed hereinbefore or any other suitable material.

Figure 4:
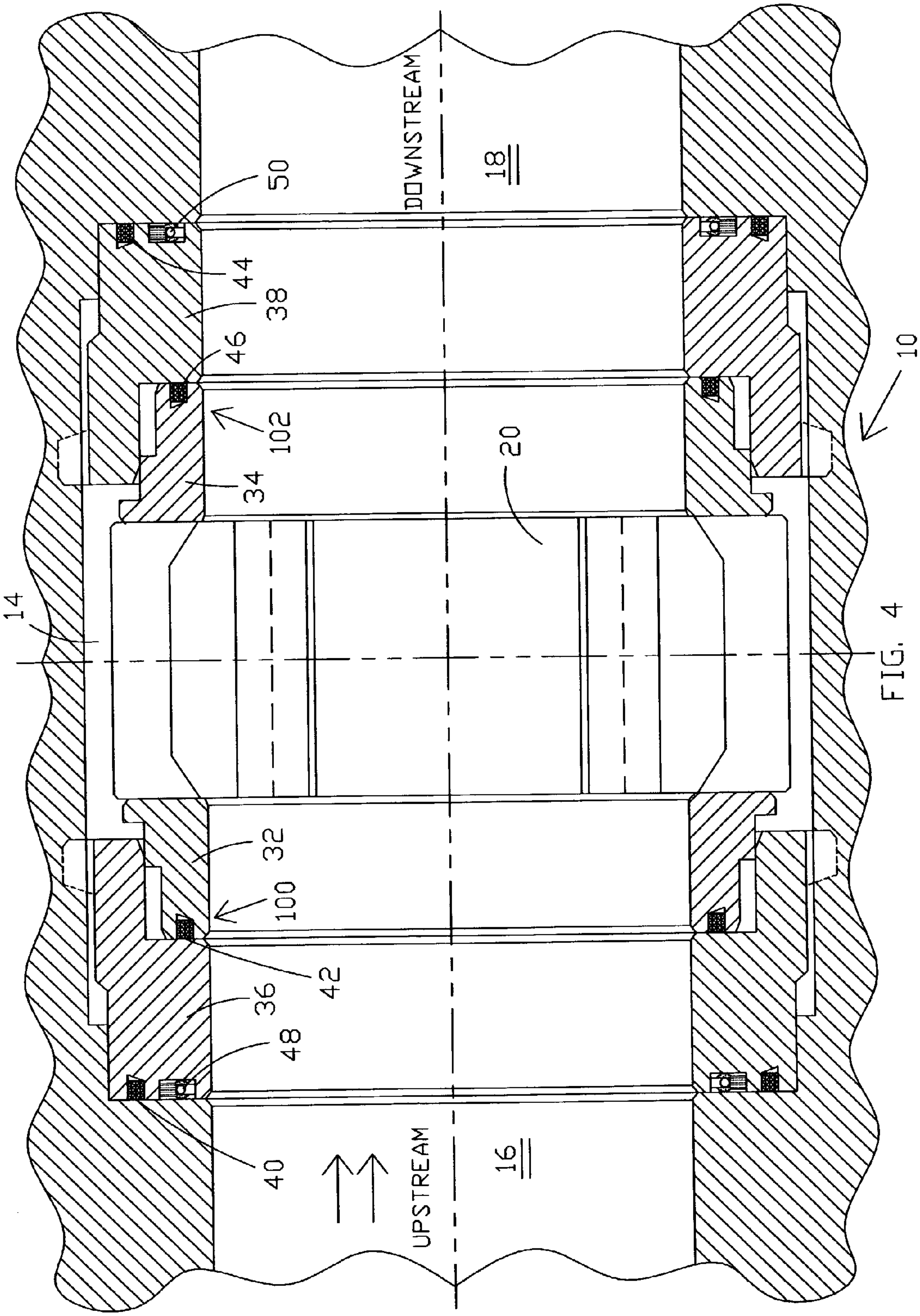
FIG. 4 is an elevational view, partially in section, of a gate valve with seals removed between the inner and outer seat elements but which still provides a downstream seal to show the redundancy of sealing elements built therein.

Note that if desired, seal assemblies 70 and 72 could simply be removed as shown in FIG. 4 to provide a downstream only sealing version of the present invention due to operation of seal 42, as explained subsequently in more detail. Thus, the present invention provides ample back up and redundancy for sealing where high reliability is essential and maintenance is difficult or impossible, e.g., for subsea valves.

In operation of the upstream sealing assemblies 100 and downstream sealing assemblies 102, after gate 20 is closed then upstream or line pressure is applied between outer seat element 36 and inner seat element 32 along surface area of radial length 84 (See FIG. 1 or FIG. 1A) at opening 86 therebetween. As explained earlier, unidirectional seal assembly 42 does not seal from pressure coming from the direction of passageway or line 16. So line pressure is applied along the entire surface area of radial length 84 which ends at seal assembly 70. Seal assembly 70 seals off line pressure from cavity 14. Shaft or ring 76 engages seal 78 to provide an initial seal even if non-elastomeric components and/or steel seal components are utilized in seal assembly 70. Other seal elements such as metal C-shaped seals, elastomeric or any other type of suitable seal could be utilized for sealing between outer seat element 36 and inner seat element 32. The area to which line pressure is applied, as indicated by radial length 84, is greater than the area on the other side of outer seat element 36 as indicated at 88 in FIG. 1. Thus, the differential force produced by the line pressure acting on the surface areas indicated by 84 and 88 will move outer seat element 36 away from gate 20 to sealingly engage pocket 28. Likewise the surface area indicated by 84 acting on inner seat element 32 is greater than the surface of metal to metal seal bottom bevel. Therefore a differential force is produced to move inner seat element into engagement with gate 20 to maintain a tight metal-to-metal seal. However, because the force is proportional to line pressure, the friction required to overcome the metal-to-metal seal to open the valve is limited to that required for sealing thereby reducing wear and extending valve life.

On the downstream side, the downstream seal is only needed if the upstream seal fails. The axial movement of gate 20 induced by pressure in upstream line or passageway 16, urges gate 20 or other valve element to produce a metal-to-metal seal at 92 between gate 20 and downstream inner seat element 34. Seal 72 seals between inner seat element 34 and outer seat element 38 to prevent leakage from valve cavity 14 to downstream line 18. Seat element 44 seals with pocket 30 to prevent leakage therethrough between valve cavity 14 and downstream line 18.

It will be noted that seal 46 acts as a backup downstream seal in the configuration of FIG. 1. In the configuration of FIG. 4, seal 46 produces the downstream seal without seal 72. Thus, seal 46 would provide a downstream seal in the configuration of FIG. 4 even if seal 72 were missing or if it were to fail. Thus, the present invention provides a great deal of redundancy of seals for greater reliability and/or may be configured to operate differently merely by changing or removing seals. Not only is there redundancy of having an upstream and downstream seal, but there is also redundancy built into, for instance, the downstream seal itself. The result is a very highly reliable valve.

If pressure is removed from upstream line 16, such as if valve 10 is disconnected, then any pressure trapped in cavity 14 will push outer seat element 36 away from gate 20 because the force due to pressure acting on area 85 is greater than the opposing force acting on area 87. Likewise, seat element 38 will be pushed away from gate 20. For the same reason, forces acting on inner seat elements 32 and 34 will move those elements away from gate 20. The pressure in cavity 14 can then bleed off between the inner seat element 32 and gate 20. Note that after upstream line pressure is removed, gate 20 is no longer urged toward inner seat element 34 and so line pressure may also bleed off between gate 20 and inner seat element 34.

Figure 3:
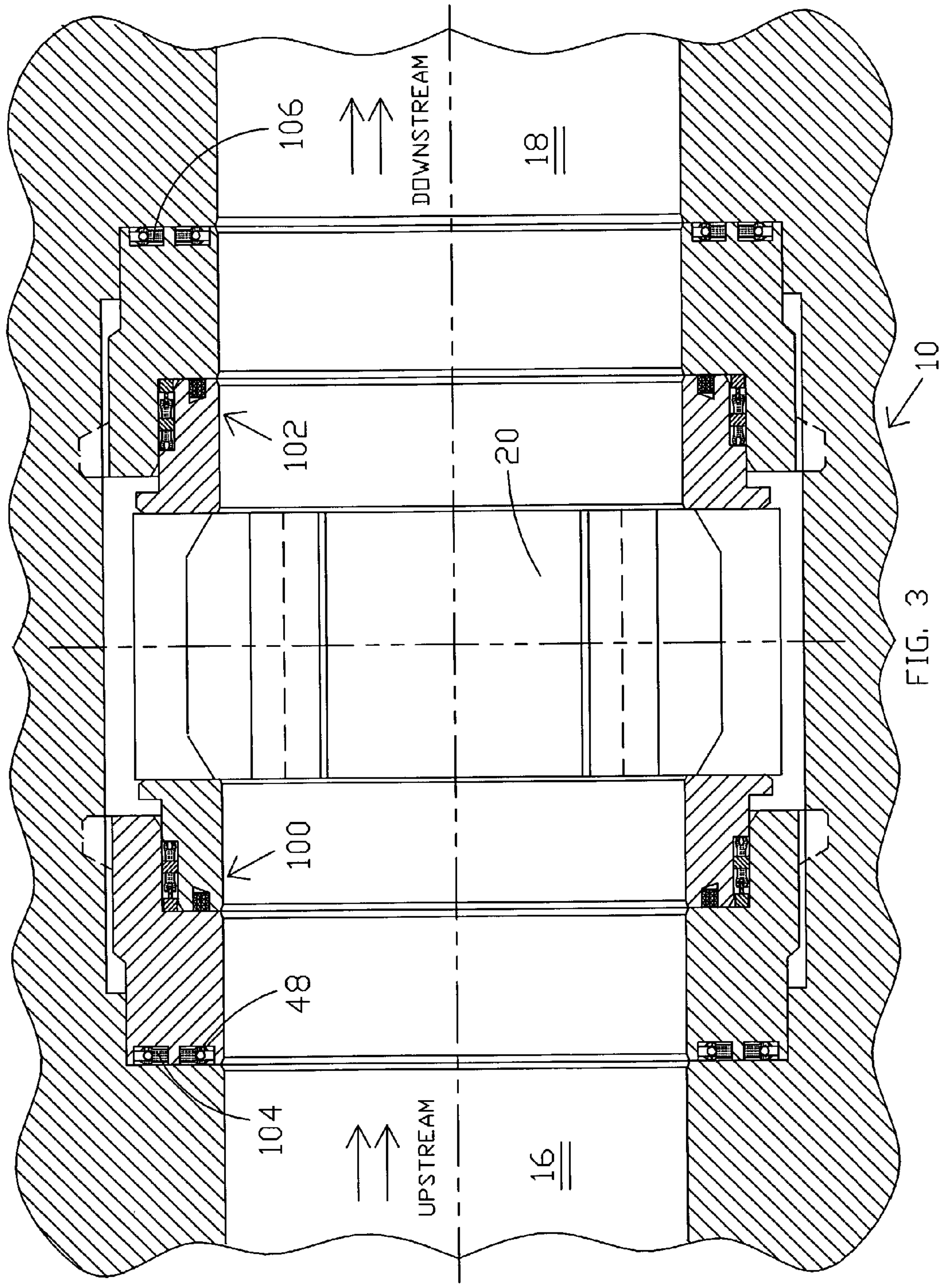
FIG. 3 is an elevational view, partially in section, of a gate valve seat assembly wherein a different type of unidirectional seal is utilized as compared to the system of FIG. 1.

FIG. 3 shows a similar sealing arrangement to that of FIG. 1 but unidirectional seal assemblies 104 and 106 may be utilized to replace seal assemblies 40 and 44 of upstream sealing assembly 100 and downstream sealing assembly 102, respectively. For downstream sealing, the wings of seal assembly 106 are forced outwardly by any pressure differential with high pressure in cavity 14 and low pressure in downstream line 18. The wings of seal assembly 104 likewise permit release of pressure trapped between seal assemblies 104 and 48 to de-energize the seals between valve operations, as discussed hereinbefore. The use of seal assemblies 104 and 106 also provide for a small area leading to cavity 14. Therefore, as discussed above, if pressure is trapped in cavity 14 then the differential force acting on the outer seat elements will move them away from gate 20. This leads to bleeding off of pressure in cavity 14 after the line pressure is removed in the manner discussed above.

Figure 5:
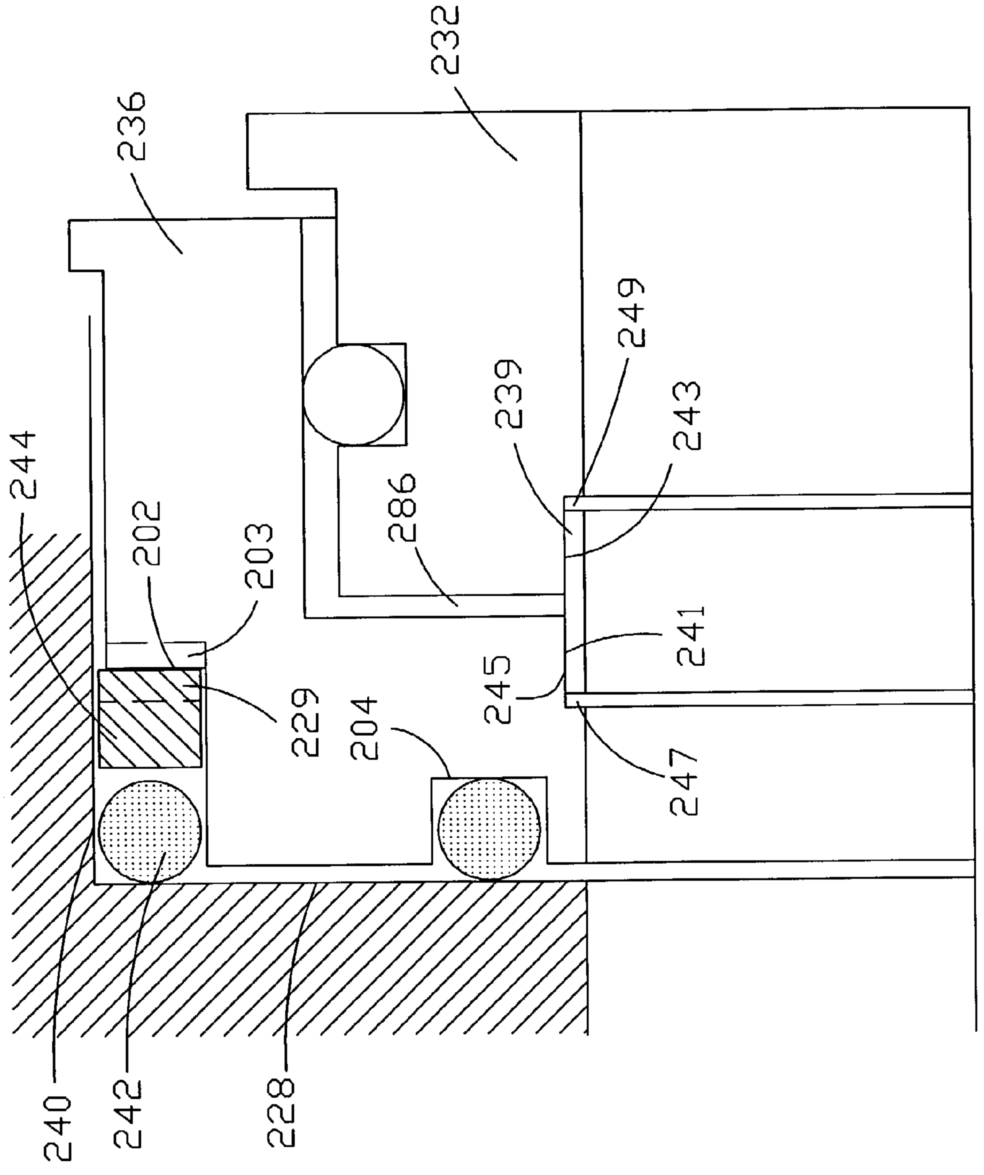
FIG. 5 is an elevational view, partially in section, of prior art outer and inner seat elements utilizing a junk ring to prevent debris entering the gate chamber and having seal and seal back up rings that hold the retainer in position for installation purposes.
Figure 6:
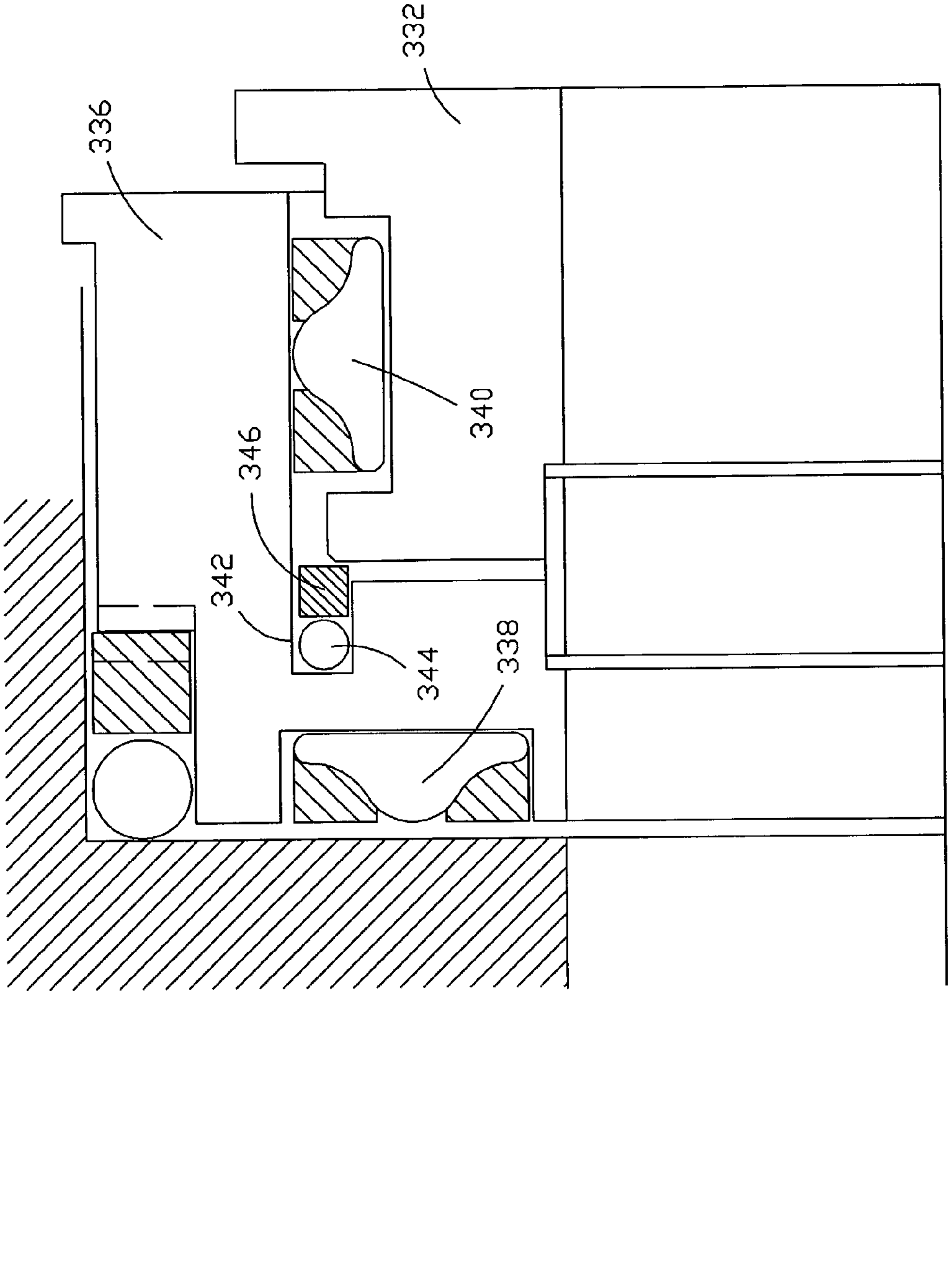
FIG. 6 is an elevational view, partially in section, of a T-seal assembly utilized for sealing with the outer and inner seat elements of FIG. 5.
Figure 7:
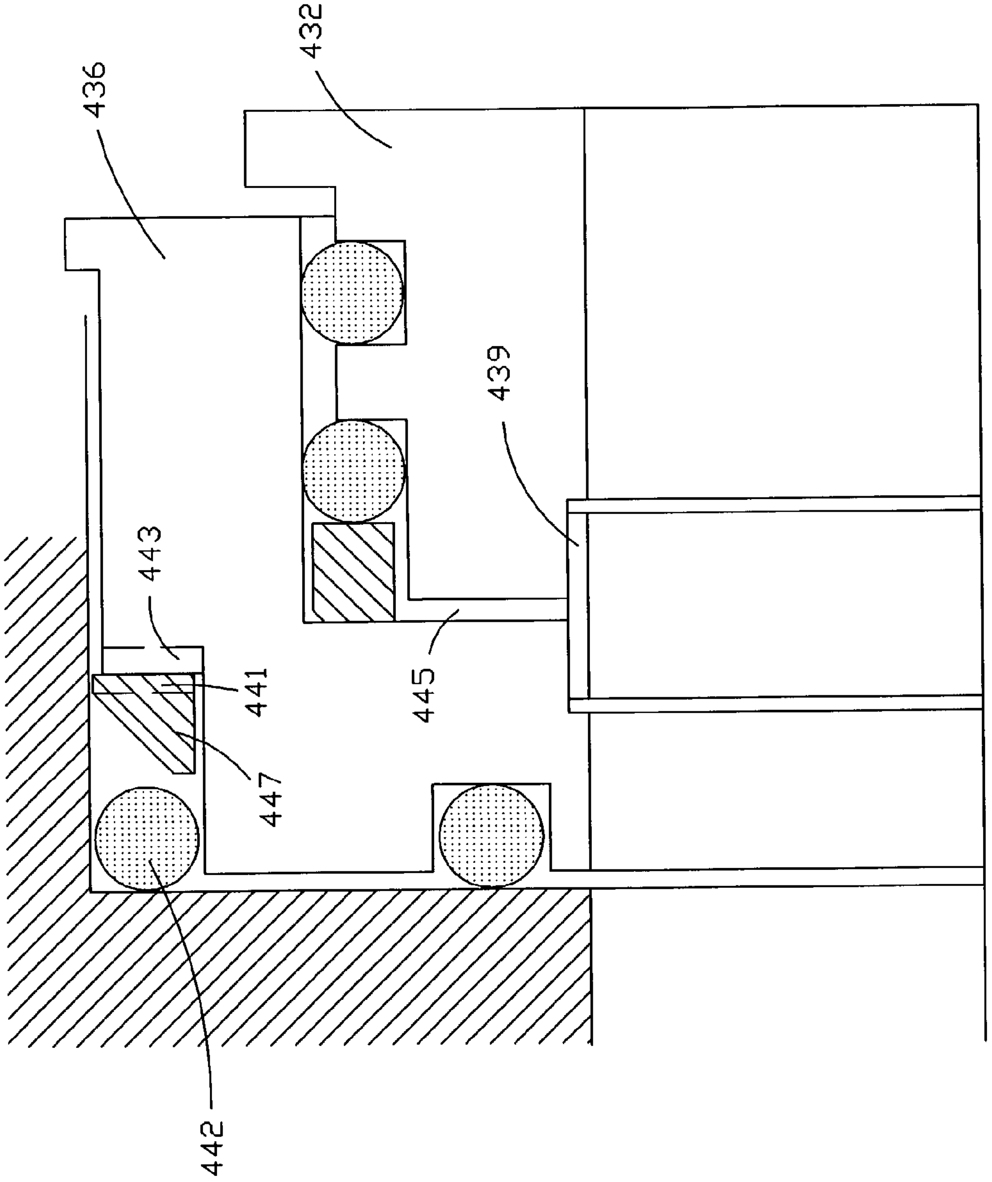
FIG. 7 is an elevational view, partially in section, with a triangular cross-section seal backup ring.

FIG. 5, FIG. 6, and FIG. 7 are prior art embodiments which show additional related seal assemblies and features thereof which may be utilized in whole or part in valve 10 and may possibly be utilized in conjunction with other seal assemblies discussed hereinbefore. In FIG. 5, first and second grooves 202 and 204 are provided for use between pocket 228 and outer seat 236 on the outer surface of outer seat 236. Grooves 202 and 204 may comprise various seal assemblies. Groove 202 may also include slot 203 leading to the valve cavity to provide an extra flow path for de-energizing the pocket seal assemblies as discussed hereinbefore.

Seal assembly 240 may comprise seal ring 242 and back up ring 244 in the general configuration of groove 202. Back up ring 244 may normally fit tightly into groove 202 to provide an interference fit and thereby provide a force that acts to prevent outer seat 236 from easily moving out of pocket 228 as might occur during installation of outer seat element 236. Seal ring 242 may be compressible whereby when uncompressed the diameter of seal ring 242 is larger than the width of groove 202 in which it is positioned. Therefore, seal ring 242 when compressed engages the surface of pocket 228 also produces a force within groove 202 which acts to hold outer seat 236 in position. Back up ring 244 may be provided with one or more notches 229. Although back up ring 244 is preferably of one-piece construction, ring 244 may comprise one or more splits, or have a split portion, or be at least partially split. The one or more notches permit de-energizing of seal assemblies 240 and 242 due to pressure that may become trapped therein as explained earlier.

Junk ring 239 may be utilized between outer seat member 236 and inner seat member 232 to prevent debris from entering passageway 286 therebetween. Junk ring 239 forms a lip or extension for insertion into cut out sections 241 and 243 on outer seat member 236 and inner seat member 232. During operation with pressure, junk ring 239 expands to narrow passageway 245 as compared to passageway 286. Passageway 245 may also be narrow as compared to passageways 247 or 249. Although passageway 245 is narrowed, sufficient pressure is communicated to passageway 286 to cause outer seat element 236 to move away from the gate and inner seat member 232 to move toward the gate for sealing purposes as discussed earlier. As explained earlier, because outer seat element 236 and inner seat element 232 move relatively away from each other, passageway 286 expands. If junk ring 239 were not used, then larger particles might enter passageway 286 causing blockages that interfere with operation and/or sealing.

FIG. 6 shows yet another prior art type of seal arrangement for use between outer seat element 336 and inner seat element 332. Seal assemblies 338 and 340 may comprise T-seal assemblies that may be utilized, for instance, in high temperature applications. In this example, an additional groove 342 is provided in outer seat element 336 for seal 344 and back up ring 346. Seal 344 and back up ring 346 may be utilized as back up seal for downstream sealing. As noted hereinbefore, for downstream sealing the floating gate moves axially in response to line pressure to compress the two downstream seat elements together within the downstream pocket. When used as an upstream seal, seal ring 344 does not prevent fluid flow through the passageway between the inner and outer seat assemblies 332 and 336.

FIG. 7 shows yet another seal arrangement for use with outer seat element 436 and inner seat element 432. Junk ring 439 is provided to prevent or block debris into passageway 445 as explained hereinbefore. Back up ring 447 may have a triangular or other type of cross-sectional shape for wedging action with respect to seal 442 for enhancing sealing. Slots 441 in back up ring 447 and/or slots 443 in outer seat element 436 may be utilized for enhancing the de-energizing the pocket seal assemblies as discussed hereinbefore.

In summary, the seal assemblies for use in the present invention may comprise a wide variety of different sealing assemblies only a few variations of which are disclosed herein. A wide variety of different seals including elastomeric, U-shaped seals, T-shaped seals, unidirectional seals, and seals with various cross-sectional shapes and designs may be utilized.

The upstream and downstream seal assemblies 102 and 104 may be mirror image seals which function differently depending on whether they are positioned upstream or downstream.

It will be understood that the components are shown in substantially conceptual form for ease of explanation and are not intended to represent manufacturing dimensions, sizes, or details. In fact, the dimensions may be exaggerated to more clearly show the features of discussion. The present invention has numerous valuable advantages including extended temperature and pressure applications as well as venting between the valve chamber and the line, and also the possibility of providing a downstream backup seal in case the primary upstream seal fails. In other words, the present invention results in a highly reliable valve for use under a wide range of operating conditions and pressures.

The foregoing disclosure and description of the invention is illustrative and explanatory thereof, and it will be appreciated by those skilled in the art, that various changes in the size, shape and materials as well as in the details of the illustrated construction or combinations of features of the various valve elements may be made without departing from the spirit of the invention.

What is claimed is:

1. A valve comprising:

a valve body having a closure member and a closure member chamber therein, said valve body defining inlet and outlet passages extending through said valve body in communication with said closure member chamber to define a flow path through said valve body, said valve body having a respective pocket surrounding said inlet and outlet passages adjacent to said closure member chamber;

a telescoping seat assembly in each of said pockets recesses, each said telescoping seat assembly comprising, an outer seat element for sealing within said pocket of said valve body, an inner seat element relatively moveable with respect to said outer seat element for sealing engagement with said closure member, said outer seat element and said inner seat element defining surfaces therebetween whereby pressure in at least one of said inlet and outlet passages acting thereon during operation of said valve urges said outer seat element to move relatively away from said inner seat element to enhance respective sealing with said pocket and said closure member, and a seal disposed in a groove within at least one of said outer seat element or said inner seat element, said groove comprising therein a tapered surface such that said seal is moveable along said tapered surface, whereby pressure acting on a first side of said seal produces a force on said seal which wedges said seal into a sealing engagement position, said seal in said sealing engagement position being positioned so as to seal at least one between said outer seat element and said pocket or between said outer seat element and said inner seat element, and pressure acting on an opposite second side moves said seal along said tapered surface out of said sealing engagement position.

2. The valve of claim 1, further comprising:

one or more slots in said outer seat element, said one or more slots opening into said groove.

3. The valve of claim 1, wherein said tapered surface defines a groove wall whereby a groove depth increases with increasing radial distance away from said flow path.

4. The valve of claim 1, further comprising wherein said groove is formed within said outer seat element adjacent said pocket of said valve body for sealing engagement with said valve body when said pressure acts on said first side of said seal, and pressure acting on said opposite second side of said seal moves said seal away from engagement with said pocket of said valve body.

5. The valve of claim 1, further comprising:

said outer seat element and said inner seat element defining a second groove therebetween, a pair of oppositely oriented unidirectional seals mounted within said second groove.

6. The valve of claim 5, further comprising a seal ring mounted between said pair of oppositely oriented unidirectional seals.

7. The valve of claim 1, wherein said groove is defined between said outer seat element and said inner seat element, said tapering surface varying in depth with increasing distance of said tapered surface from said flow path.

8. A valve comprising:

a valve body having a closure member and a closure member chamber therein, said valve body defining upstream and downstream passages extending through said valve body and being in communication with said chamber to define a flow path through said valve body, said valve body defining pockets surrounding said upstream and downstream passages adjacent to said closure member chamber;

a telescoping seat assembly in said pockets, said telescoping seat assembly comprising, an outer seat element for sealing within said pocket of said valve body, and an inner seat element moveable with respect to said outer seat element for sealing engagement with said closure member, said outer seat element and said inner seat element defining surfaces therebetween whereby pressure in at least one of said inlet or outlet passages acting on said surfaces during operation of said valve urges said outer seat element to move relatively away from said inner seat element to enhance respective sealing with said pocket and said closure member, a seal disposed in a groove in at least one of said outer seat element or said inner seat element, said groove comprising therein a tapering surface, said tapering surface defining a groove depth which varies with increasing radial distance away from said flow path.

9. The valve of claim 8, further comprising:

said groove being in said outer seat element, a second groove being formed in said inner seat element, said second groove having therein a second tapering surface defining a second groove depth which varies with increasing distance of said second tapered surface from said flow path.

10. The valve of claim 8, wherein said groove is formed on said outer seat element adjacent said pocket of said valve, said seal is moveable along said tapered surface, whereby pressure acting on one side of said seal produces a force on said seal, which wedges said seal into engagement with said pocket of said valve body and pressure acting on an opposite side of said seal moves said seal away from engagement with said pocket of said valve body.

11. The valve of claim 8, further comprising:

said outer seat element and said inner seat element defining a slot therebetween, a pair of oppositely oriented unidirectional seals mounted within said slot.

12. The valve of claim 11, further comprising a seal ring mounted between said pair of oppositely oriented unidirectional seals.

13. The valve of claim 12, wherein said seal ring comprises a split seal ring.

14. A valve comprising:

a valve body having a closure member and a closure member chamber therein, said valve body defining inlet and outlet passages extending through said valve body and being in communication with said chamber to define a flow path through said valve body, said valve body having a pocket surrounding said inlet and outlet passages adjacent to said closure member chamber;

a telescoping seat assembly in said pockets, said telescoping seat assembly comprising, an outer seat element for sealing within said pocket of said valve body; and an inner seat element moveable with respect to said outer seat element for sealing engagement with said closure member, said outer seat element and said inner seat element defining a slot therebetween, a pair of oppositely oriented unidirectional seals mounted within said slot.

15. The valve of claim 14, further comprising:

further comprising a seal ring mounted between said pair of oppositely oriented unidirectional seals.

16. The valve of claim 15, said ring being split and disposed in a groove positioned between said pair of oppositely oriented unidirectional seals.

17. The valve of claim 16, further comprising:

a groove defined in at least one of said first seat element and said second seat element said groove having therein a surface oriented so as to be angularly offset with an axis of said flow path through said valve body.

18. A method for a valve, said valve having a valve body with a passageway therethrough and a gate chamber therein, a pair of recesses along said passageway adjacent said gate chamber; said method comprising:

providing telescoping seat assemblies with inner and outer seat components for each of said recesses to thereby form a flow path between said inner and outer seat components, said outer seat components and said inner seat components defining surfaces therebetween whereby pressure in at least an upstream portion of said passageway acting on said surfaces during operation of said valve urges a respective outer seat component to move relatively away from a respective inner seat component;

forming a groove in at least one of said inner and outer seat components;

providing a tapering groove wall within said groove which is angularly offset with respect to said passageway; and providing a seal ring which is moveable in said groove along said tapering groove wall.

19. The method of claim 18, further comprising:

positioning said seal such that said tapering groove wall urges said seal into a sealing position if pressure is applied to a first side of said seal, and such that if pressure is applied to an opposite side of said seal then said seal moves along said tapering groove wall out of said sealing position.

20. A valve body having a closure member and a closure member chamber therein, inlet and outlet passages extending through said valve body and being in communication with said closure member chamber to define a flow path through said valve body, said valve body defining a pocket surrounding said inlet and outlet passages adjacent to said closure member chamber;

a telescoping seat assembly in said pockets, said telescoping seat assembly comprising, an outer seat element for sealing within said pocket of said valve body;

an inner seat element moveable with respect to said outer seat element for sealing engagement with said closure member, said outer seat element and said inner seat element defining surfaces therebetween whereby pressure in at least one of said inlet or outlet passageways acting thereon during operation urges said outer seat element relatively away from said inner seat element to enhance respective sealing with said pocket and said closure member; and a groove disposed in at least one of said inner seat element or said outer seat element, a seal moveable within said groove along a tapering surface defining said groove.

21. The valve of claim 20, wherein said tapering surface defines a slot which provides communication with said closure member chamber.

22. The valve of claim 21, wherein said inner closure member and said outer closure member define an opening therebetween, two oppositely oriented unidirectional seals being positioned in said opening.

23. The valve of claim 22, a seal ring being disposed between said two oppositely oriented unidirectional seals.

* * * * *

UNITED STATES PATENT AND TRADEMARK OFFICE

CERTIFICATE OF CORRECTION

PATENT NO. : 6,966,537 B2
DATED : November 22, 2005
INVENTOR(S) : Alagarsamy Sundararajan It is certified that error appears in the above-identified patent and that said Letters Patent is hereby corrected as shown below:

Title page,
Item [54], Title, should read:
-- VALVE WITH SEAT ASSEMBLY AND METHOD --.

Column 1,
Line 1, insert -- AND METHOD -- after "ASSEMBLY".

Column 14,
Line 66, delete "recesses".

Column 15,
Line 21, insert -- of -- after "one".

Column 16,
Line 63, insert -- , -- after "element".

Signed and Sealed this

Twenty-first Day of February, 2006

JON W. DUDAS
*Director of the United States Patent and Trademark Office*